United States Patent
High et al.

(10) Patent No.: US 10,631,169 B2
(45) Date of Patent: Apr. 21, 2020

(54) UNMANNED RETAIL DELIVERY VEHICLE PROTECTION SYSTEMS AND METHODS OF PROTECTION

(71) Applicant: Walmart Apollo, LLC, Bentonville, AR (US)

(72) Inventors: Donald R. High, Noel, MO (US); David C. Winkle, Bella Vista, AR (US); John J. O'Brien, Farmington, AR (US); Robert L. Cantrell, Herndon, VA (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/424,101

(22) Filed: May 28, 2019

(65) Prior Publication Data

US 2019/0373476 A1 Dec. 5, 2019

Related U.S. Application Data

(60) Provisional application No. 62/677,577, filed on May 29, 2018.

(51) Int. Cl.
| | |
|---|---|
| *H04W 12/12* | (2009.01) |
| *G06Q 10/08* | (2012.01) |
| *G05D 1/02* | (2020.01) |

(52) U.S. Cl.
CPC ...... *H04W 12/1204* (2019.01); *G05D 1/0214* (2013.01); *G05D 1/0276* (2013.01); *G05D 1/0287* (2013.01); *G06Q 10/08355* (2013.01)

(58) Field of Classification Search
CPC ............ H04W 12/1204; G05D 1/0214; G05D 1/0276; G05D 1/0287; G06Q 10/08355
(Continued)

(56) References Cited

U.S. PATENT DOCUMENTS

| | | |
|---|---|---|
| 9,524,648 B1 | 12/2016 | Gopalakrishnan |
| 9,643,722 B1 | 5/2017 | Myslinski |

(Continued)

OTHER PUBLICATIONS

Daubert et al., "HoneyDrone: A medium-interaction unmanned aerial vehicle honeypot", Apr. 2018, IEEE, IEEE/IFIP Network Operations and Management Symposium, all pages. (Year: 2018).*

(Continued)

*Primary Examiner* — Michael S McNally
(74) *Attorney, Agent, or Firm* — Fitch, Even, Tabin & Flannery LLP

(57) ABSTRACT

Some embodiments provide systems and methods of enhancing protection of unmanned retail delivery vehicles. Some of these embodiments comprise: a plurality of unmanned delivery vehicles (UDV); a plurality of lure unmanned vehicles; and a procedure randomization system configured to randomly select a protection procedure that is not to be implemented by a first lure unmanned vehicle to enhance an attack vulnerability; and wherein a first lure vehicle control circuit of the first lure unmanned vehicle is configured to obtain a first lure route and control the first lure unmanned vehicle to travel along the first lure route while preventing the selected first protection procedure from being applied while applying at least a sub-set of the set of the plurality of protection procedures to a full capacity while the first lure unmanned vehicle travels along the first lure route.

18 Claims, 4 Drawing Sheets

(58) Field of Classification Search
USPC .......................................................... 726/25
See application file for complete search history.

(56) References Cited

U.S. PATENT DOCUMENTS

| | | |
|---|---|---|
| 2015/0006005 A1 | 1/2015 | Yu |
| 2015/0242972 A1 | 8/2015 | Lemmey |
| 2016/0023760 A1 | 1/2016 | Goodrich |
| 2016/0033966 A1 | 2/2016 | Farris |
| 2016/0163204 A1 | 6/2016 | Raptopoulos |
| 2016/0274912 A1 | 9/2016 | Schoenberger |
| 2016/0378108 A1 | 12/2016 | Paczan |
| 2017/0069214 A1 | 3/2017 | Dupray |
| 2017/0144756 A1 | 5/2017 | Rastgaar Aagaah |
| 2017/0313421 A1 | 11/2017 | Gil |
| 2018/0065748 A1 | 3/2018 | Gordon |
| 2019/0089722 A1* | 3/2019 | Ciocarlie ................ H04L 67/22 |
| 2019/0191311 A1* | 6/2019 | O'Brien ................ G01C 21/005 |

OTHER PUBLICATIONS

MSi; "MSi's Secure Sentinel Platform Protects Unmanned Aerial Vehicles Against Cyber Attacks"; https://www.missionsecure.com/docs/MSi_Case_UV_online.pdf; Available at least as early as Nov. 17, 2017; pp. 1-2.

Gil Casals, Silvia et al.; "Generic and autonomous system for airborne networks cyber-threat detection"; Digital Avionics Systems Conference (DASC), 2013 IEEE/AIAA 32nd; Oct. 5-10, 2013, pp. 1-17.

Güvenç, Ismail et al.; "Detection, localization, and tracking of unauthorized UAS and Jammers"; Digital Avionics Systems Conference (DASC), 2017 IEEE/AIAA 36th; Sep. 17-21, 2017; pp. 1-13.

PCT; App. No. PCT/US2019/033221; International Search Report and Written Opinion dated Aug. 19, 2019.

Sedjelmaci, Hichem et al.; "How to Detect Cyber-Attacks in Unmanned Aerial Vehicles Network?"; Global Communications Conference (GLOBECOM), 2016 IEEE; Dec. 4-8, 2016; pp. 1-9.

* cited by examiner

UNMANNED RETAIL DELIVERY VEHICLE PROTECTION SYSTEMS AND METHODS OF PROTECTION

CROSS-REFERENCE TO RELATED APPLICATION(S)

This application claims the benefit of U.S. Provisional Application No. 62/677,577 filed May 29, 2018, which is incorporated herein by reference in its entirety.

TECHNICAL FIELD

This invention relates generally to systems to provide delivery of retail items.

BACKGROUND

Getting retail products to customers can be critical. Often, customers go to retail stores to select and purchase items. More customers are ordering retail items on-line or at retail stores requesting the items be delivered. Accordingly, there is a need to improve customer delivery of retail items.

BRIEF DESCRIPTION OF THE DRAWINGS

Disclosed herein are embodiments of systems, apparatuses and methods pertaining retail delivery systems with enhanced security. This description includes drawings, wherein.

Figure 1:
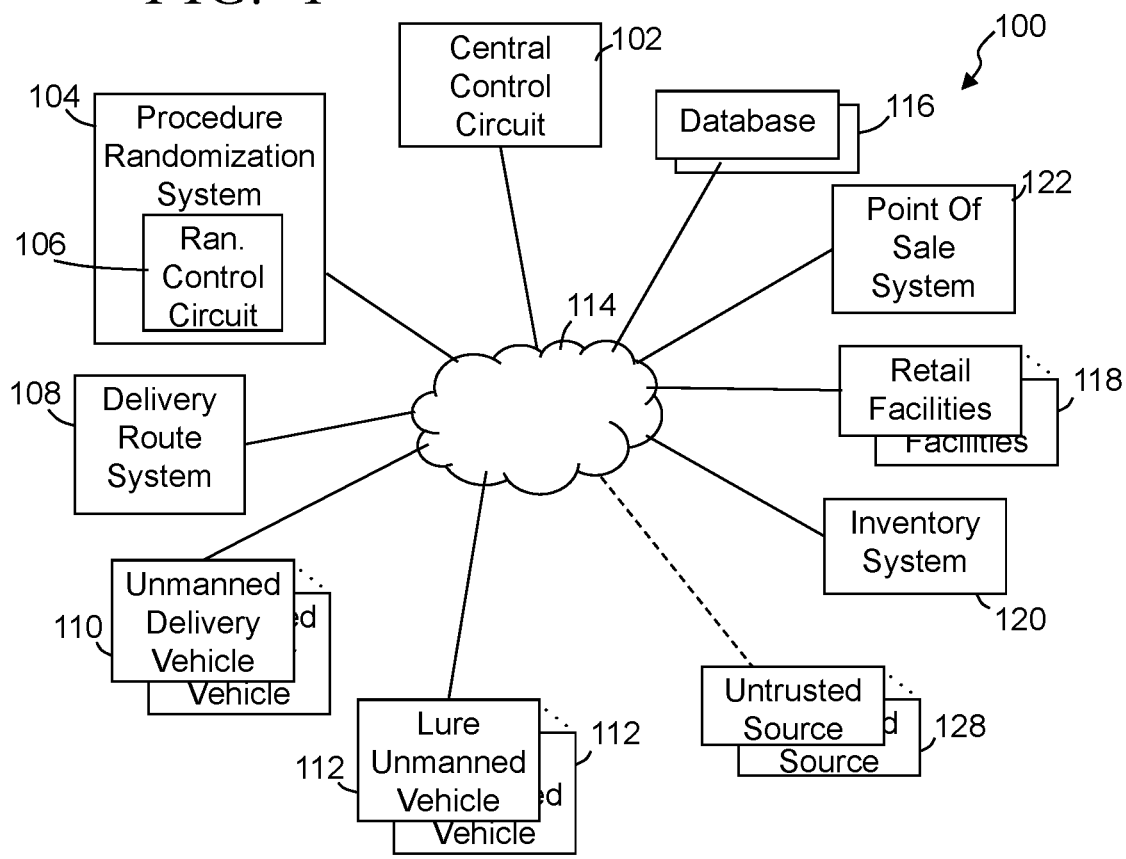
FIG. 1 illustrates a simplified block diagram of an exemplary unmanned retail delivery vehicle protection system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods provide retail delivery systems with enhanced security utilizing unmanned vehicles. In some embodiments, an unmanned retail delivery vehicle protection system comprises a plurality of unmanned delivery vehicles (UDV) each configured to carry a package to a corresponding predefined delivery location of multiple different delivery locations. Each unmanned delivery vehicle comprises a vehicle control circuit configured to obtain delivery route information defining a delivery route between a launch location to a delivery location, control the unmanned delivery vehicle to travel along the delivery route from the launch location to the delivery location and release at least one package for delivery at the delivery location. The protection system further includes a plurality of lure unmanned vehicles each comprising a lure motor, a lure propulsion system, a lure wireless transceiver, and a lure vehicle control circuit that is communicatively coupled with the lure motor, and the lure wireless transceiver. One or more procedure randomization systems are further included in the protection system, and are configured to randomly select at least a first protection procedure, of a set of a plurality of different protection procedures, that is not to be implemented by a lure unmanned vehicle while traveling along at least part of a lure route. The lure unmanned vehicle enhances an attack vulnerability of the lure unmanned vehicle from an external attack threat by not implementing the first protection procedure. In some embodiments, the set of the plurality of different protection procedures comprises, for example, wireless communication protection schemes, access protections, and operational commands. The lure vehicle control circuit of the lure unmanned vehicle is configured to obtain a lure route and control the lure unmanned vehicle to travel along the lure route while preventing the selected first protection procedure from being applied while applying at least a sub-set of the set of the plurality of protection procedures to a full capacity while the lure unmanned vehicle travels along the lure route.

Some embodiments provide methods of protecting unmanned retail delivery vehicles, comprising: operating a plurality of unmanned delivery vehicles (UDV) each configured to carry a package to a corresponding predefined delivery location of multiple different delivery locations while traveling along the corresponding delivery route from a launch location to the delivery location and release at least one package for delivery at the delivery location; operating a plurality of lure unmanned vehicles; and randomly selecting, through a procedure randomization system, at least a first protection procedure, of a set of a plurality of different protection procedures, that is not to be implemented by a lure unmanned vehicle to enhance an attack vulnerability of the lure unmanned vehicle, of the plurality of lure unmanned vehicles, from an external attack threat, wherein the set of the plurality of different protection procedures comprises at least wireless communication protection schemes, routes of travel, and operational commands; obtaining, by a lure vehicle control circuit of the lure unmanned vehicle, a lure route; and controlling the lure unmanned vehicle to travel along the lure route while preventing the selected first protection procedure from being applied while applying at least a sub-set of the set of the plurality of protection procedures to a full capacity while the lure unmanned vehicle travels along the lure route. In part, the random selection of the one or more protection procedures to disable and/or limit reduced the likelihood that an attacker detects the lure unmanned vehicle as bait or a "honeypot", and reduces the probability of potential attackers detecting lure patterns. Accordingly, the lure unmanned vehicle is more likely to induce or trick attackers into attacking the lure unmanned vehicle.

FIG. 1 illustrates a simplified block diagram of an exemplary unmanned retail delivery vehicle protection system 100, in accordance with some embodiments. The protection system 100 is configured to enhance protection for numerous unmanned delivery vehicles (UDV) 110 each configured to transport one or more retail items (e.g., purchased by customers) over at least a portion of and often along all of a delivery route to an intended delivery location associated with a customer intended to receive the retail item. In some embodiments, the protection system 100 includes one or more central control circuits and/or systems 102, one or more procedure randomization systems 104, one or more delivery route systems 108, the plurality of unmanned delivery vehicles 110, an a plurality of lure unmanned vehicles 112. The protection system 100 typically further includes one or more computer and/or communication networks 114 enabling wired and wireless communication at least between the central control circuit 102 and the procedure randomization system 104, the delivery route system 108, the unmanned delivery vehicles 110, and the lure unmanned vehicles 112. One or more databases 116 may further be included as part of the protection system 100 and/or communicatively accessed by one or more components of the protection system.

The central control circuit 102 is associated with and/or is part of one or more retail systems of one or more retail facilities 118, such as retail stores, fulfillment centers, distribution centers or the like. The retail facilities 118 have tens of thousands of retail products that can be purchased by different customers. Further, the retail facilities utilize the plurality of unmanned delivery vehicles to transport purchased retail items along at least part of a delivery route to an intended delivery location associated with a corresponding customer. The retail systems of the one or more retail facilities typically include one or more inventory systems 120 that track and update retail inventory information for the tens of thousands of products available from the associated one or more retail facilities based at least in part on sales, orders, shipments and the like. The inventory system is communicatively coupled with or can include one or more point of sale systems 122 that receive purchase requests from customers and implement the sale and acquisition of payment for a requested retail item. The point of sale systems may be a physical system at a retail facility that is operated by a worker of the retail facility or customer at the retail facility, may be an on-line application implemented by one or more servers accessed through one or more websites, other such purchase systems, or a combination of such point of sale systems.

The one or more databases 116 store information accessible by one or more of the components of the protection system 100. For example, the databases may include one or more rules databases storing unconventional protection rules that are applied by the central control circuit, procedure randomization system, delivery route system and/or other components of the protection system that previously were unavailable to such systems and could not be implemented by such systems or computer systems. In some embodiments, rules are applied in part to provide instructions to and/or control at least one or more of the lure unmanned vehicles 112. These rules go beyond simply matching capabilities, and instead enhance the protection of unmanned delivery vehicles 110, products, potential delivery routes and other aspects of the protection system. Further, the application of these rules at least partially if not fully automate the implementation of lure unmanned vehicles 112. Similarly, the delivery route system 108 may apply one or more route rules from the rules database in determining appropriate routes to be followed by the unmanned delivery vehicles 110 and/or lure unmanned vehicles. The delivery route system determines and/or selects routes that unmanned delivery vehicles 110 are to follow between a launch point and one or more delivery locations. The delivery route system may take into consideration locations of attacks on one or more unmanned and/or manned vehicles, congestion, weather, vehicle capabilities, recharging and/or refueling stations, other unmanned delivery vehicles that are to transfer or receive one or more packages, expected and/or requested delivery times, quantities of items to be delivered, number of available unmanned delivery vehicles, return or retrieval location where the unmanned delivery vehicle is to return or be retrieved, mapping information, restrictions (e.g., restricted air space, restricted routes of travel, etc.), other such factors, or typically a combination of two or more of such factors.

Figure 2:
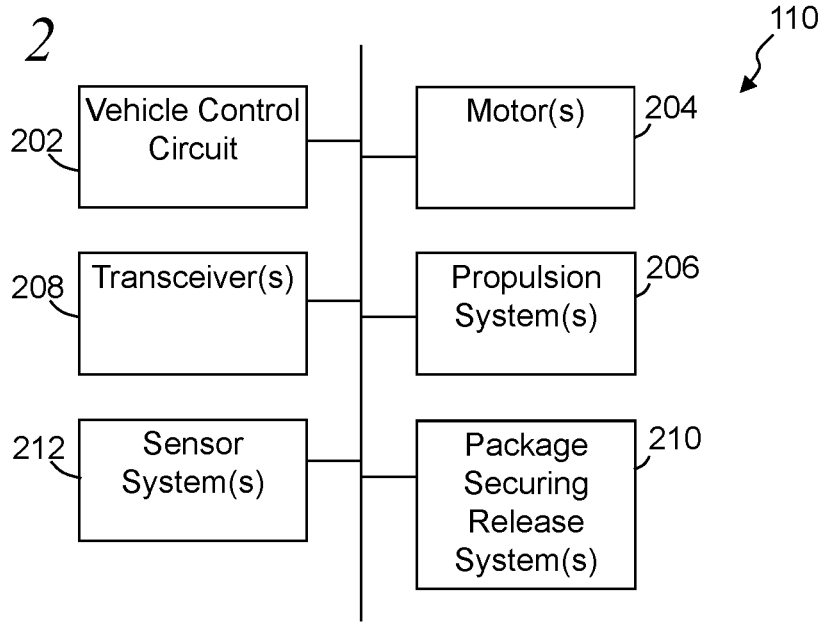
FIG. 2 illustrates a simplified block diagram of an exemplary unmanned delivery vehicle, in accordance with some embodiments.

FIG. 2 illustrates a simplified block diagram of an exemplary unmanned delivery vehicle 110 that is configured to carry one or more items or packages to a corresponding predefined delivery location of multiple different delivery locations, in accordance with some embodiments. The unmanned delivery vehicle 110, in some implementations, includes one or more vehicle control circuits 202, one or more motors 204 cooperated with one or more propulsion systems 206, one or more wireless communication transceivers 208 (e.g., cellular, satellite, Wi-Fi, Bluetooth, RF, other such wireless communications, or combination of such wireless communications), and one or more item or package securing and release system 210. The unmanned delivery vehicle may be an aerial vehicle, a ground-based vehicle, a water-based vehicle, or other relevant vehicle. The vehicle control circuit 202 is implemented through one or more processors and/or microprocessors and is communicatively coupled with the one or more motors 204 to control the motors in controlling the one or more propulsion systems 206 to implement and control movement of the unmanned delivery vehicle. The propulsion systems may include propellers, wheels, treads, drivetrains, transmissions, and/or other such propulsion systems that enable a vehicle to move and control movement of the vehicle. The vehicle control circuit is further configured to obtain delivery route information defining a delivery route between a launch location to a delivery location. Typically, the delivery route system 108 uses a launch location from which the unmanned delivery vehicle 110 is intended to be released, one or more intended delivery locations, mapping information, restrictions (e.g., restricted air space, restricted routes of travel, etc.), other such information, or combination of such information to determine an intended delivery route to be followed by the unmanned delivery vehicle. The unmanned delivery vehicle may receive the delivery route through wired and/or wireless communication. The one or more motors can be controlled to control the movement of the unmanned delivery vehicle to travel along the delivery route from the launch location to the delivery location and release at least one package for delivery at the delivery location. Typically, the unmanned delivery vehicles includes multiple sensor systems 212 that are communicatively coupled with the vehicle control circuit 202 providing sensor data to the vehicle control circuit that is used to adjust movement and keep the unmanned vehicle traveling along or within a threshold of the intended delivery route. The sensor systems can include location sensor systems (e.g., GPS, RF, wireless signal triangulation, beacon detection, laser distance measurement systems, other such systems, or often a combination of two or more of such systems), proximity sensors, weather and/or environment sensors, attack detection systems, other such systems, or combination of two or more of such systems.

Figure 3:
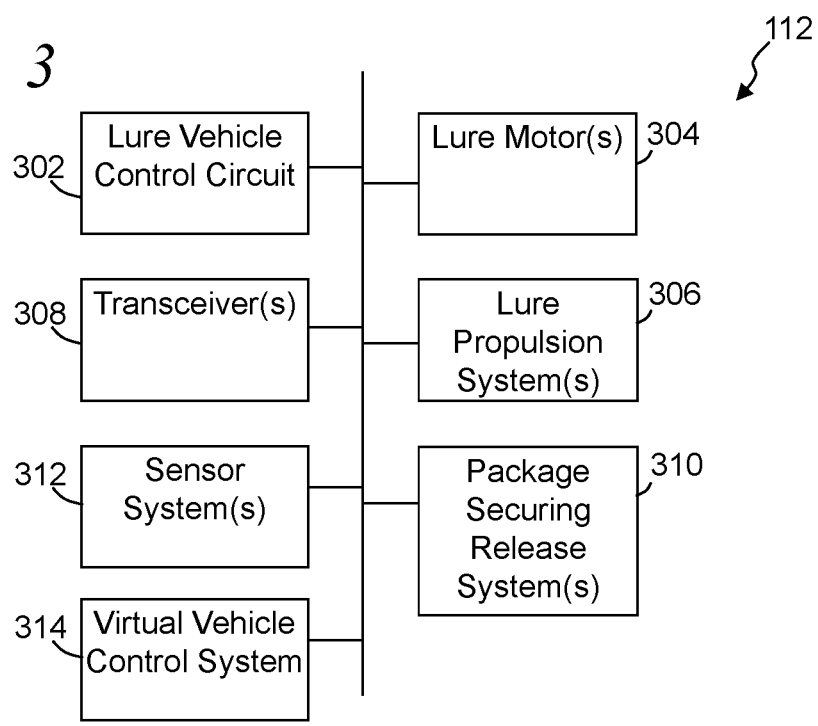
FIG. 3 illustrates a simplified block diagram of an exemplary lure unmanned vehicle, in accordance with some embodiments.

FIG. 3 illustrates a simplified block diagram of an exemplary lure unmanned vehicle 112 that is configured to present itself in a manner to entice and/or allow attacks against the vehicle and its control systems, in accordance with some embodiments. The lure unmanned vehicle 112, in some implementations, includes one or more lure vehicle control circuits 302, one or more lure motors 304 cooperated with one or more lure propulsion systems 306, and one or more lure wireless communication transceivers 308 (e.g., cellular, satellite, Wi-Fi, Bluetooth, RF, other such wireless communications, or combination of such wireless communications). The lure unmanned vehicle may be an aerial vehicle, a ground-based vehicle, a water-based vehicle, or other relevant vehicle. Typically, the lure unmanned vehicle includes one or more item or package securing and release system 310, or at least an artificial package securing system. Further, in many applications the lure unmanned vehicle is intended to at least appear substantially the same if not the same as an unmanned delivery vehicle 110. In some embodiments, the lure unmanned vehicle includes one or more virtual vehicle control systems 314 and/or virtual rendering system.

The lure vehicle control circuit 302 is implemented through one or more processors and/or microprocessors and is communicatively coupled with the one or more motors 304 to control the motors in controlling the one or more propulsion systems 306 to implement and control movement of the lure unmanned vehicle. The propulsion systems may include propellers, wheels, treads, drivetrains, transmissions, and/or other such propulsion systems that enable a vehicle to move and control movement of the vehicle. The lure vehicle control circuit 302 is further configured to obtain route information defining a lure route along which the lure unmanned vehicle is intended to travel in presenting itself as a target for attacks. In some implementations, the delivery route system 108 and/or a separate lure routing system uses a launch location from which the lure unmanned vehicle 112 is intended to be released, one or more intended target locations where attacks are predicted to more likely to occur, return or retrieval location where the lure unmanned vehicle is to return or be retrieved, mapping information, restrictions (e.g., restricted air space, restricted routes of travel, etc.), other factors such as those outlined above, other such information, or combination of such information to determine an intended lure route to be traveled one or more times by the lure unmanned vehicle. The lure unmanned vehicle receives the delivery route through wired and/or wireless communications. The lure vehicle control circuit operatively couple with the one or more motors to control the motor in controlling the movement of the lure unmanned vehicle to travel along the intended lure route. Further, the lure unmanned vehicles includes multiple sensor systems 312 that are communicatively coupled with the lure vehicle control circuit 302 providing sensor data to the lure vehicle control circuit 302 that is used to adjust movement and keep the lure unmanned vehicle traveling along or within a threshold of the intended lure route. The sensor systems can include location sensor systems (e.g., GPS, RF, wireless signal triangulation, beacon detection, laser distance measurement systems, other such systems, or often a combination of two or more of such systems), proximity sensors, weather and/or environment sensors, attack detection systems, other such systems, or combination of two or more of such systems. The virtual vehicle control system 314, in some applications is implemented by the lure vehicle control circuit 302 or communicatively coupled with the vehicle control circuit, and configured to provide virtual information to an attacking party to appear as though the attacking party is gaining entry to one or more systems or sub-systems of the lure unmanned vehicle, and/or providing output information (e.g., sensor data, image and/or video data, etc.) to appear to the attacker as though the lure unmanned vehicle is be responding appropriately to received control commands from the attacking party. For example, the lure unmanned vehicle may include an imaging/camera system mounted on a gimbal that allows the camera to move independent of a direction of travel of the lure unmanned vehicle, and a camera control circuit may control a zoom aspect of the camera. Image captured can be relayed to the attacking party by controlling the direction of the camera and the rate of the zoom to appear as though the lure unmanned vehicle is moving in a direction commanded by the attacking party even though the lure unmanned vehicle is not moving in the specified direction or at least not moving directly along the commanded route and/or at the speed commanded.

Referring to FIGS. 1-3, the central control circuit 102 is communicatively coupled with the procedure randomization system 104. In some implementations, the procedure randomization system includes a randomization control circuit 106, while in other implementations some or all of the procedure randomization system is implemented by the one or more central control circuits 102. The procedure randomization system is configured to access the rules database and apply one or more sets of rules to select one or more protection procedures, of a set of a plurality of different protection procedures, that are not to be implemented or operated at a reduced capacity (e.g., reduced effectiveness, intermittently applied, randomly applied for limited times, utilizing a less effective corresponding procedure, etc.) by the lure unmanned vehicle. In some embodiments, the procedure randomization system 104 applies one or more rules of a set of lure route rules to be applied in selecting one or more lure routes of a set of potential lure routes along which the corresponding lure unmanned vehicle is to travel while the selected one or more protection procedures are disabled or applied with reduced capacity. In some instances, one or more of the selected lure routes correspond to at least part of one or more of the delivery routes that one or more of the plurality of unmanned delivery vehicles 110 have traveled, are traveling and/or are scheduled to travel. Selecting a lure route that at least partially corresponds to the delivery route can enhance an attack vulnerability of the lure unmanned vehicle 112, of the plurality of lure unmanned vehicles, from an external attack threat. The potential set of lure routes may include an optimal route, which would be the route most likely to attract the attack (e.g., flying directly over the predicted threat). By using the random selection, however, the protection system further camouflages the use of the lure unmanned vehicles allowing the operation of the lure unmanned vehicles to look more realistic and less likely to be identified as an intended honeypot target unmanned vehicles.

As introduced above, there are a several different protection procedures that can be applied by the lure unmanned vehicle that can be utilized by the unmanned delivery vehicles that enhance protection of the unmanned delivery vehicles. These protection procedures can include but are not limited to methods and/or protocols of communication, wireless communication protection schemes (e.g., authentication schemes, acknowledgment schemes, frequency of communication, sequence of variations in communication, encryption, wireless modes of communication, wireless equivalent privacy (WEP), etc.), routes of travel and/or modifications in routes of travel, operational commands and/or communication patterns (e.g., commands received in a predefined order, navigational information received at specified times or order, transitional information, requests for instructions, command formatting, specific types of commands, etc.), encryption methods, inducing changes in communication protocols, authentication procedures, levels of security access to different operational parts of the unmanned delivery vehicles and/or levels of operation of the vehicle control circuit, access protections (e.g., password requirements, authentication, authentication through a remote source, encryption, etc.), and other such protection procedures. Typically, the unmanned delivery vehicles apply a set of two or more of such protection procedures. Further, potential attackers are often familiar with many if not all of these protection procedures and employ various methods of attempting to override, circumvent and comply with one or more of these protection procedures in attempts to "attack" an unmanned delivery vehicle. By reducing or eliminating one or more of these protection procedures, the lure unmanned vehicle appears to be more susceptible to attack and can induce attackers to take one or more actions and/or prolong actions to attack the lure unmanned vehicle.

Accordingly, the procedure randomization system 104 applies one or more rules to select one or more of the protection procedures, which potentially can be applied by the lure unmanned vehicle, that are to be disabled and/or operated at reduced capacity. Not operating such protection procedures and/or operating at reduced levels of effectiveness makes the lure unmanned vehicle 112 at least appear to a potential attack to be more vulnerable to attack, and often makes the lure unmanned vehicle more susceptible to external attacks by third parties attempting to attack an unmanned delivery vehicle. Such attacks may be intended to disrupt deliveries, steal items carried by unmanned delivery vehicles, damage unmanned delivery vehicles, override or steal the unmanned delivery vehicle, cause the unmanned delivery vehicle to go to an unintended destination, and other such actions. The random selection rules are configured to cause the variation in the selection of the one or more protection procedures that are applied by a lure unmanned vehicle and/or those protection procedures that are to be disabled or operated at reduced capacity. This variation attempts to mask the lure unmanned vehicle as a potential lure to the attacking party. It has been determined that by continuing to disable and/or reduce the effectiveness of the same one or a few protection procedures, attackers will be more likely to recognize an unmanned vehicle as a lure vehicle instead of a unmanned delivery vehicle 110 or other unmanned vehicle of perceived value.

Some embodiments may allow an operator to select one or more of the protection procedures to disable and/or implement with a reduced effectiveness. Such user selection, however, may result in intentional or unintentional repetition of selected protection procedures or schemes, which may be detected by potential attackers. Alternatively, the randomization rules applied by the procedure randomization system 104 provide for the randomization of the selection of one or more protection procedures making it much more difficult to identify or predict that an unmanned vehicle is a lure unmanned vehicle 112 attempting to encourage attacks. Such randomization could not have previously been achieved as a manual selection, even when attempting to be random, would result in non-random selection based on tendencies, biases and/or other characteristics and preferences of the selector. Accordingly, the protection system 100 provides an improved technological process of enhancing protection of unmanned vehicle delivery of retail items by in part randomizing the vulnerability of different lure unmanned vehicles and/or randomizing the distribution of those lure unmanned vehicles to attacks and detecting attacks.

In some embodiments, the rules consider historic applications and elimination one or more protection procedures that were recently selected. Further, the rules often consider a lure route or routes that were traveled by previous lure unmanned vehicles 112 in association with which one or more protection procedures were disabled and/or applied at reduced capacity. For example, one or more rules exclude one or more previously selected protection procedures that for one or more sets of lure routes within a threshold distance of lure routes traveled by a lure unmanned vehicle while the one or more previously selected protection procedures were disabled or operated at reduced capacity. Additionally or alternatively, the procedure randomization system applies a randomization strategy to randomly select one or more of the protection procedures to be disabled and/or operated at a reduced capacity. Similarly, the randomization rules may dictate the selection of a random number of the protection procedures that are to be disabled, and/or random number of protection procedures to be operated at a reduced effectiveness. In some embodiments, each protection procedure is associated with a particular numeric value, and the procedure randomization system randomly selects one or more numbers from the set of numbers corresponding to the protection procedures. In some implementations, as described above and further below, one or more of the protection procedures may be excluded from the selection (e.g., based on historic selections, determined effectiveness over time of inducing attacks in association with a region and/or lure route to be followed, protection procedures selected relative to a similar attack or an attacker, and/or other such rules and/or factors). Further, multiple different lure unmanned vehicles may be activated with similar or the same selected protection procedures that are to be disabled or operated at reduced effectiveness. Additionally, these similarly configured different lure unmanned vehicles may be directed along the same or similar selected lure routes. The duplicity further camouflages the unmanned vehicles as lure unmanned vehicles as the multiple lure unmanned vehicles appear to be following a predefined delivery route that entices the attack.

The central control circuit 102 and/or the procedure randomization system 104 communicate the identification of the selected one or more protection procedures to one or more lure unmanned vehicles. The lure vehicle control circuit the lure unmanned vehicle utilized the identified selected protection procedures and is configured to obtain a lure route and control the lure unmanned vehicle to travel along the lure route while preventing one or more the protection procedure from being applied and/or being fully applied, while still applying at least a sub-set of the set of the plurality of protection procedures to a full capacity while the lure unmanned vehicle travels along the intended lure route.

Again, in some instances, the procedure randomization system 104 additionally or alternatively randomly select one or more protection procedures of the set of the plurality of protection procedures that are to be implemented at a reduced capacity or effectiveness from the full capacity to further enhance an attack vulnerability of the lure unmanned vehicle from the external attack threat. The lure vehicle control circuit implements the selected reduced capacity protection procedure at the reduced capacity applied while applying at least the sub-set of the set of the plurality of protection procedures to their full capacity while the lure unmanned vehicle travels along the intended one or more lure routes. In some instances, the reduced effectiveness corresponds to a protection procedure that is likely to be overcome by the attack (e.g., simple or weak passcode, basic or well-known scrambling or encryption, etc.).

Further, in some embodiments the procedure randomization system 104 is further configured to randomly select one or more lure routes from a sub-set of multiple different lure routes. By randomizing the lure route a lure unmanned vehicle travels, the protection system 100 further camouflages the lure unmanned vehicle in attempts to increase the likelihood that the lure unmanned vehicle is actually attacked. Further, the central control circuit, which is separate from and communicatively coupled with the plurality of unmanned delivery vehicles and the plurality of lure unmanned vehicles, can be configured to identify a location of a previously detected attack. The sub-set of the multiple different lure routes, from a set of a plurality of different lure routes, can be specified by the central control system based on the identified previous attacks. In some applications, the sub-set of different lure routes may be limited based on one or more potential lure routes that are within a threshold distance of the location of one or more of the previously detected attacks. Further, the central control circuit may access and apply a set of one or more evaluation rules to evaluate previously detected attacks reported by previous lure unmanned vehicles and/or unmanned delivery vehicles to identify geographic areas and/or route corridors (e.g., containing multiple or threshold number of different predefined delivery routes and/or lure routes) of higher concentrations of previous attacks. In some instances, geographic regions are defined and rated based on the number of previously detected attacks in those areas and/or predictions of future attacks.

In some embodiments, the central control circuit 102 receive a detection location, which may be detected or determined by the lure unmanned vehicle or one or more sensor systems external to the lure unmanned vehicle (e.g., cellular tower in communication with the lure unmanned vehicle, one or more other unmanned vehicles in communication with the lure unmanned vehicle, one or more transport vehicles configured to transport the lure unmanned vehicle, or the like) corresponding to a detection by the lure vehicle control circuit of the detected external attack. In some embodiments, the lure vehicle control circuit 302 is configured to detect and/or be notified of an attack or attempted attack by an external source, and acquires a current location, which may be based on a current reading (e.g., GPS), previous readings and sensor data, and/or other such location information. This location information can be wirelessly communicated to the central control circuit in response to detecting the attack. The central control circuit can be configured to select and direct one or more additional lure unmanned vehicles of the set of the plurality of lure unmanned vehicles to one or more different probing locations that are within thresholds of the detection location where the attack was detected. The original lure unmanned vehicle and/or the one or more additional lure unmanned vehicles may further communicate location information, sensor information, and/or other relevant information to the central control circuit. The location information and/or sensor may be based, in some instances, on the detection by the original lure unmanned vehicle and the one or more additional lure unmanned vehicles of subsequent attempted attacks, detected wireless communications, which may or may not be directed on the original lure unmanned vehicle and the one or more additional lure unmanned vehicles, route information actually traveled by the original lure unmanned vehicle and the one or more additional lure unmanned vehicles prior to, during and/or after one or more subsequent attempted attacks, and/or other such conditions.

Based on input received from the original lure unmanned vehicle and the one or more additional lure unmanned vehicles, the central control circuit can attempt to determine a location or geographic region from which the attacks are occurring. In some embodiments, the central control circuit triangulates an estimated attacker location based on subsequent location information provided by one or more of the original lure unmanned vehicle and the one or more additional lure unmanned vehicles. Additionally, in some embodiments, the central control circuit may direct a swarm of multiple lure unmanned vehicles at the potential attacker. The central control circuit may be configured to direct multiple additional lure unmanned vehicles to locations within a threshold counter-attack location of the estimated attacker location, and instruct the multiple additional lure unmanned vehicles to each apply at least one of multiple different counter-attack measures directed at the attacker. Such multiple different counter-attack measures may include, but are not limited to one or more of emitting wireless jamming signals, attempting to wirelessly infiltrate an attacking computing system, interfering with a travel and/or flight path of an attacking vehicle, generating audio output directed at the potential attacker in attempts to publically identify and/or discourage the attacker, directing one or more unmanned vehicles to intercept and attempt to force an attacking vehicle toward a desired location (e.g., force an unmanned aerial attacking vehicle to the ground, directing an attacking unmanned vehicle toward a location of the police, etc.), launching a net or other counter attack at an attacking vehicle, launching one or more counter hacking attacks of one or more systems and/or circuitry of an attacking system, capturing a URL or other identifying information of an attacking system, and/or other such counter actions. Further, in some embodiments the central control circuit can communicate with one or more governmental authorities (e.g., police, Federal Bureau of Investigations, Federal Communications Commission, Federal Aviation Administration, and/or other such government authority or agency), and/or third party services that can take one or more actions. Information acquired by the one or more lure unmanned vehicles may be further communicated to the governmental authorities for use in identifying, countering and/or prosecuting the attacking party or parties.

In some embodiments, the central control circuit is further configured to direct instructions to an attacked first lure unmanned vehicle to disengage from further interaction with the external attack, and cause a corresponding lure route to be communicated to the second lure unmanned vehicle that is within the threshold distance with the attack location detected by the first lure unmanned vehicle. By implementing the corresponding lure route, the second lure unmanned vehicle subsequently because an available and potentially tempting target to the attacker. The disengagement by the first lure unmanned vehicle can appear to the attacker as a common counter measure by an unmanned vehicle providing a further camouflage for the lure unmanned vehicle and attempting to entice the attacking party to continue to attack one or more additional lure unmanned vehicles. Further, in some implementations, the procedure randomization system is further configured to randomly select one or more protection procedures, of the set of a plurality of different protection procedures, that is not to be implemented by the second lure unmanned vehicle while attempting to lure further attacks by the attacker and to enhance at least an appearance of attack vulnerability of the second lure unmanned vehicle from an external attack threat while traveling along the second lure route and while the first lure unmanned vehicle is disengaged from the external attack. The continued enticement can be implemented in attempts to keep the attacking party active to allow more accurate identification of a location of the attacking system and/or identify the attacking party.

In some embodiments, the lure unmanned vehicle may have multiple different layers of protection. One or more less critical layers may be implemented with reduced protection procedures to appear to an attacker as a vulnerable target and provide feedback to the attacker that the attack is succeeding. The lure vehicle control circuit and/or other sub-systems of the lure unmanned vehicle, in some implementations, is configured to detect that the attack has infiltrated a first layer of operation of the lure vehicle control circuit. In response to the detected attack, the lure vehicle control circuit can present the attack with access to a predefined non-critical layer of operation, such as a non-critical layer of memory, control over one or more non-critical sub-systems (e.g., some communications systems, some sensor systems, some protection procedure control systems, other such sub-systems, or a combination of two or more of such sub-systems). Additionally or alternatively, the lure unmanned vehicle, the lure vehicle control circuit and/or one or more sub-systems may present fake, inaccurate, incomplete and/or artificial information regarding the operation of the lure vehicle control circuit and/or one or more sub-systems through the non-critical layer of operation. Simultaneously, the lure vehicle control circuit can collect attack information regarding at least one or more of controls the attack is attempting to access. Similarly, the lure vehicle control circuit may collect attack information regarding software tools being utilized by the attacker in the attack (e.g., based on URLs, patterns of communications, confirmation exchanges, etc.).

Similarly, in some embodiments a lure vehicle control circuit can be configured to enable an attack to infiltrate a virtual vehicle control circuit of the lure vehicle control circuit. The virtual control circuit appears to the attack to implement commands received from the attack to appear as though the attack is controlling the lure unmanned vehicle without actually affecting the operation of the lure unmanned vehicle, and while providing a virtual appearance of further penetration by the attack into the operations of the virtual vehicle control circuit. Such a virtual penetration can provide feedback and communications to the attack as though implementing instructed commands, while the actual lure vehicle control circuit maintains control over the lure unmanned vehicle and does not actually implement the instructed commands or provide access to critical information and/or sub-systems. The virtual vehicle control may be implemented similar to a video game simulator with communications back to the attacking party being consistent with what would be expected based on the requests and commands received from the attack. The virtual hack can keep an attack continuing and engaging the attacker to allow for greater opportunity to acquire information about the attacker, the location of the attacker, the tools utilized by the attacker, the modes of attack applied, and the like. Further, some of the sub-systems of the lure unmanned vehicle may be activated to enhance the virtual appearance of having hacked into at least a portion of the lure unmanned vehicle. For example, the lure vehicle control circuit may control the navigation of the lure unmanned vehicle to actually implement one or more or a portion of one or more navigation commands received by the attack. Additionally or alternatively, the lure vehicle control circuit may control a camera sub-system on the lure unmanned vehicle to capture images and/or video to appear as though the lure unmanned vehicle is implementing instructions received from the attack (e.g., controlling the pan, tilt and zoom aspects of the camera system and/or the rates of pan, tilt and zoom to capture images and/or video to appear as though the lure unmanned vehicle is traveling in a direction instructed by the attack). The virtual simulation can provide, in some embodiments, the appearance that the compromised lure vehicle control circuit and/or operating system can lead to access to the central control circuit 102. This can keep the attacking party engaged for a longer period of time, provide additional information about the attacker and provide additional time to potentially locate the attacking party. Similarly, by occupying the attacking party with a lure unmanned vehicle, the attacking party is not or is less likely to be attacking the unmanned delivery vehicles 110 and reducing or eliminating disruptions to the delivery process. Further, information can be acquired about the attacking parties and corresponding attacking profiles of the attacking parties can be accumulated and built over time. These attacking profiles can be used to reduce time to detect attacks, to more readily identify a potential attacker, identify patterns of attacks, identify patterns of locations of attacks, and other such information.

In some embodiments, the lure unmanned vehicles and/or the unmanned delivery vehicles are further configured to retain and/or forward communication information received from non-recognized third party sources to the central control system. The lure vehicle control circuit 302 and/or the vehicle control circuits 202 of the unmanned delivery vehicles 110 may, in some applications, be configured to broadcast some information to be detected by one or more external sources. For example, some mission critical and/or important information is communicated in an encrypted form, while some non-critical information and/or artificial information may be communicated in an unencrypted form (or a reduced protected form) in an attempt to receive replies from unknown third party systems, which may or may not be parties that intend to attack or otherwise harm the retail system, deliveries and/or the protection system 100. Detected return communications and/or actions can be tracked and some or all of the information stored and evaluated by the receiving vehicle, by the central control circuit 102, by a separate evaluation system, by an Airborne Warning And Control System (AWACS), other source or combination of two or more of such systems. Often the protection system does not known whether the unknown source should be untrusted source. Over time, the protection system can utilize received responses by unknown sources to identify sources that may be leveraged as part of the protection system and/or utilized by one or more of the delivery service and/or retail entity. The evaluation can include evaluating the type of information provided by a third party source, the protection protocols utilized by the third party source, the confirmations and/or authentications provided by the third party source, location information provided by the third party source, and/or other such relevant information that may correspond to a third party source that can be associated with one or more different levels of trust. Over time, the trust level may be upgraded or downgraded based on the accumulation over time of the information acquired from and/or about a third party source. Similarly, uncharacteristic communications and/or information may be used to downgrade a trust level and/or designate a third party source as a non-trusted source.

In some embodiments, the central control circuit 102 can receive, over time from the plurality of unmanned delivery vehicles 110 and/or the plurality of lure unmanned vehicles 112, multiple notifications of communications detected by the plurality of unmanned delivery vehicles and the plurality of lure unmanned vehicles from multiple different untrusted sources geographically distributed over multiple different delivery routes. Each of the notifications can be evaluated based on a history of numerous previous other communications directed at one or more other of the plurality of unmanned delivery vehicles and the plurality of lure unmanned vehicles and acquired over time. Based on the evaluation of the notifications based on the history, the central control circuit can identify one or more sources of the multiple different sources as having reached one or more thresholds of trustworthiness, and change a trust status of the one or more sources to a trusted source with a corresponding level of trust. In some instances, one or more levels of trust can correspond to authorizing the plurality of unmanned delivery vehicles and the plurality of lure unmanned vehicles to subsequently accept communications from these trusted sources. As such, the protection system 100 in addition to detecting attacking parties can further identify third party sources that can be trusted at one or more different levels of trust. Similarly, the protection system 100 can detect potential additional resource and determine a reliability of those resources, and incorporate those resources when a threshold level of reliability is determined.

Figure 4:
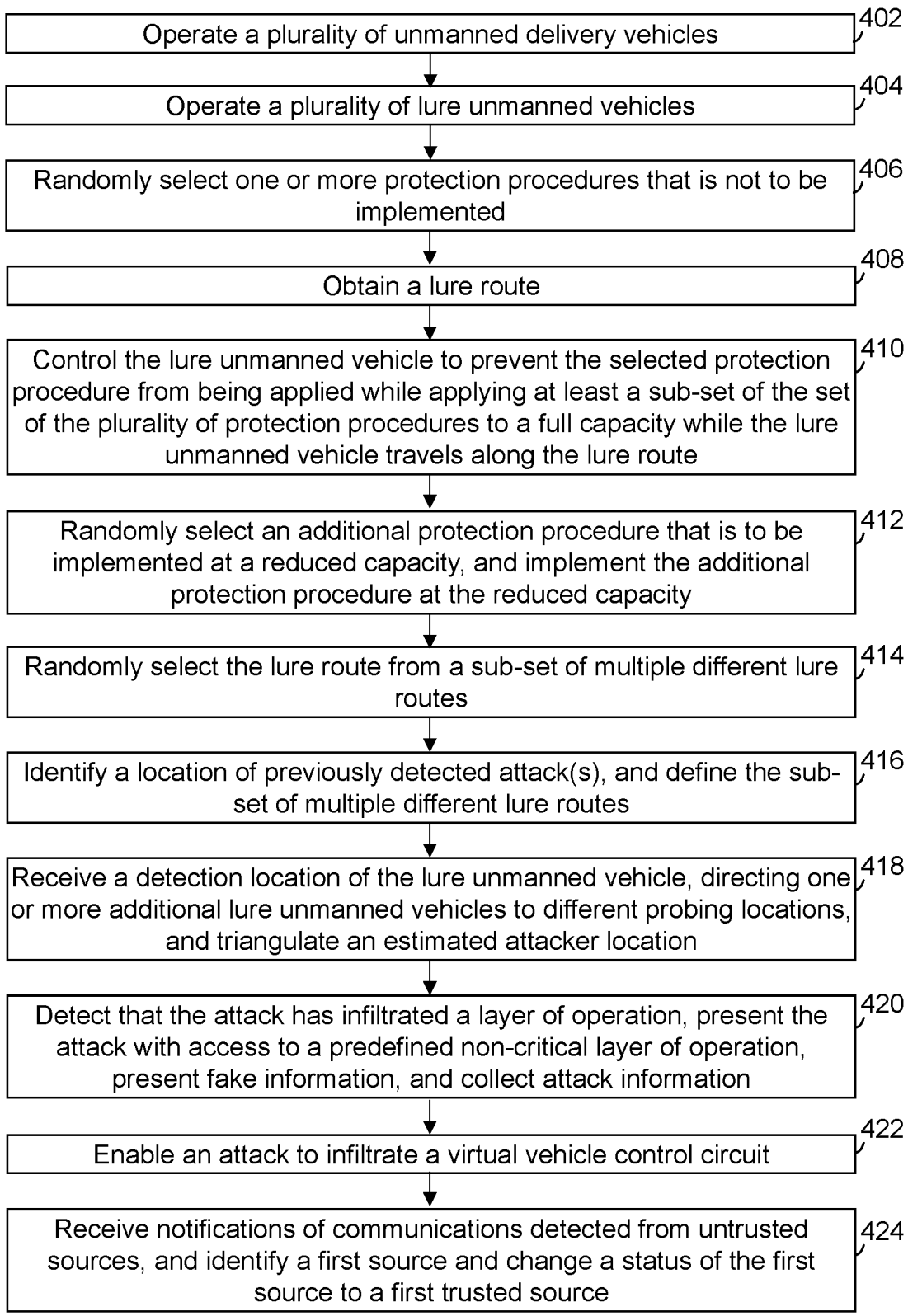
FIG. 4 illustrates a simplified flow diagram of an exemplary process of protecting unmanned retail delivery vehicles, in accordance with some embodiments.

FIG. 4 illustrates a simplified flow diagram of an exemplary process 400 of protecting unmanned retail delivery vehicles, in accordance with some embodiments. In step 402, a plurality of unmanned delivery vehicles (UDV) are operated and each is configured to carry a package or retail item to a corresponding predefined delivery location of multiple different delivery locations while traveling along corresponding delivery routes from a corresponding launch location to the corresponding delivery location, and release at least one package or item for delivery at the delivery location. In step 404, a plurality of lure unmanned vehicles are further operated in regions where the unmanned delivery vehicles travel to perform the delivery of the retail items.

In step 406, one or more protection procedures, of a set of a plurality of different protection procedures, are selected that are not to be implemented by a lure unmanned vehicle. In some embodiments, the selected one or more protection procedures are randomly selected through the procedure randomization system 104. Further, in some applications one or more filtering rules are applied to exclude one or more protection procedures that are to be randomly selected. Alternatively, all of the protection procedures are considered and potentially selected to be prevented from being applied or applied at a reduced level. The disabling of one or more protection procedures and/or operating one or more protection procedures at a reduced level of protection can enhance an attack vulnerability of a lure unmanned vehicle from an external attack threat. In some applications, the plurality of different protection procedures can include one or more of wireless communication protection schemes, routes of travel, operational commands, encryption procedures, authentication procedures, confirmation of location information, confirmation of information supplied (e.g., confirmation of a retail item being transported, confirmation of a delivery location, confirmation of a customer identifier, and the like), other such protection procedures, or a combination of two or more of such protection procedures.

In step 408, a lure route is obtained for and/or by a lure vehicle control circuit 302 of an intended lure unmanned vehicle 112. In some embodiments, the lure route is randomly selected from a sub-set of multiple different lure routes. One or more route selection filters may be applied to define the sub-set of different potential lure routes. For example, one or more rules may dictate that the lure route be within a threshold of a previously detected attack, is to be limited to being within a threshold distance of one or more anticipated delivery routes, is to be limited to exclude one or more lure routes that were previously selected within a threshold time period, and/or other such rules.

In step 410, a lure unmanned vehicle is controlled to travel along the selected lure route while preventing the selected one or more protection procedures from being applied or fully applied while applying at least a sub-set of the set of the plurality of protection procedures to a full capacity while the lure unmanned vehicle travels along the selected lure route. Some embodiments include step 412 where one or more additional protection procedures of the set of the plurality of protection procedures are randomly selected that are to be implemented at a reduced capacity from the full capacity to further enhance an attack vulnerability of the lure unmanned vehicle from the external attack threat. The lure vehicle control circuit implements the selected second protection procedure at the reduced capacity applied while applying at least the sub-set of the set of the plurality of protection procedures to their full capacity while the lure unmanned vehicle travels along the lure route.

In some embodiments, the process 400 includes step 414 where the lure route is randomly selected from a sub-set of multiple different lure routes. In some instances, the process include optional step 416 where a location of a previously detected attack is identified, which may be performed at the central control circuit 102, and the sub-set of the multiple different lure routes, from a set of a plurality of different lure routes, can be defined that are within a threshold distance of the location of the previously detected attack. Optional step 418 may be applied to receive a detection location of a first lure unmanned vehicle corresponding to a detection by the lure vehicle control circuit of the detected external attack, and direct at least a second lure unmanned vehicle and a third lure unmanned vehicle of the set of the plurality of lure unmanned vehicles to different probing locations that are within thresholds of the detection location, and triangulate an estimated attacker location based on subsequent location information provided by at least the second lure unmanned vehicle and the third lure unmanned vehicle. Some embodiments may further direct instructions to the first lure unmanned vehicle to disengage from further interaction with the external attack, communicate a second lure route to the second lure unmanned vehicle that is within the threshold distance with the first detection location, and randomly select at least a second protection procedure, of the set of a plurality of different protection procedures, that is not to be implemented to enhance an attack vulnerability of the second lure unmanned vehicle from an external attack threat while traveling along the second lure route and while the first lure unmanned vehicle is disengaged from the external attack.

Some embodiments include step 420 the first lure vehicle control circuit detects that the attack has infiltrated a first layer of operation of the first lure vehicle control circuit, presents the attack with access to a predefined non-critical layer of operation, presents fake information regarding the operation of the first lure vehicle control circuit through the non-critical layer of operation, and collects attack information regarding at least one or more of controls the attack is attempting to access and software tools being utilized in the attack. In some implementations, in optional step 422, the first lure vehicle control circuit enables the attack to infiltrate a virtual vehicle control circuit of the first lure vehicle control circuit that appears to the attack to implement commands from the attack to appear as though controlling the first lure unmanned vehicle without actually affecting the operation of the first lure unmanned vehicle, and while providing an appearance of further penetration by the attack into the operations of the virtual vehicle control circuit. Some embodiments include step 424 where the central control circuit receives, over time from the plurality of unmanned delivery vehicles and the plurality of lure unmanned vehicles, multiple notifications of communications detected by the plurality of unmanned delivery vehicles and the plurality of lure unmanned vehicles from multiple different untrusted sources geographically distributed over multiple different delivery routes, evaluates each of the notifications based on a history of numerous previous other communications directed at one or more other of the plurality of unmanned delivery vehicles and the plurality of lure unmanned vehicles and acquired over time, and identifies, based on the evaluation of the notifications based on the history, a first source of the multiple different sources and change a status of the first source to a first trusted source from which the plurality of unmanned delivery vehicles and the plurality of lure unmanned vehicles are subsequently to accept communications.

One or more lure unmanned vehicles can be directed to flying in a known location of potential hacking threats that may be known from previous flights by one or more lure unmanned vehicles and/or unmanned delivery vehicles. The lure unmanned vehicle may be configured to distribute multiple communications when engaged with a trusted network. In some embodiments, the lure unmanned vehicle, while sending trusted communications information, may broadcast information to unknown and/or untrusted entities. Additionally or alternatively, the communication distributed to the untrusted systems can be fake information that is not intended to be shared with the trusted communications. Returned responses and/or information from the untrusted systems is analyzed by the lure unmanned vehicle and/or the central control circuit. The analysis can determine a level of trustworthiness based on various factors (e.g., whether an accurate location information is provided, whether an expected authentication procedure is followed, whether the untrusted entity has predefined knowledge (e.g., information about a customer, information about a product delivery, information about one or more passwords, etc.), and other such information. For example, if the lure unmanned vehicle communicates with a non-trusted unmanned vehicle that is untrusted on its location, the lure unmanned vehicle can communicate a location request from the untrusted unmanned vehicle. The lure unmanned vehicle may further use onboard sensors (e.g., such as optical, ADS-B, GPS, etc.), to determine a general geolocation of the untrusted unmanned vehicle. If the untrusted unmanned vehicle provides a location that is within a threshold of the general geolocation determined by the lure unmanned vehicle, then a trust level of the untrusted unmanned vehicle may be increased relative to the protection system 100. A baseline can be established of trust between the lure unmanned vehicle and the untrusted unmanned vehicle. As the vehicles exchange further information, such as routing or weather, then the level of trust could increase or decrease over time depending on the generalizations made by the lure unmanned vehicle and/or central control circuit. Some or all of the trust processing and analyzing could be offloaded from the lure unmanned vehicle to another system, such as the central control circuit. This would allow the lure unmanned vehicle to focus its processing and power on the mission at hand. For example, the lure unmanned vehicle may take a data snapshot of current states and/or communications that can be analyzed and/or saved for later analysis.

In some embodiments, the procedure randomization system is configured to randomly select one or more protection procedures, of a set of a plurality of different protection procedures, that are to be eliminated or reduced while the corresponding lure unmanned vehicle is directed along a lure route that corresponds to at least part of one or more of the delivery routes of one or more of the plurality of unmanned delivery vehicles. The lure vehicle control circuit can be configured to obtain the lure route and control the lure unmanned vehicle to travel along the lure route while preventing the selected one or more protection procedures that are selected to be eliminated to simplify an external attack on the corresponding lure unmanned vehicle, and while applying each of at least a sub-set of the set of the plurality of protection procedures to a full capacity while the lure unmanned vehicle travels along the lure route.

The protection system 100 utilized the lure unmanned vehicles 112 as a lure, bait or "honey pot" for untrusted entities. In some applications, the lure unmanned vehicles distribute false information to untrusted entities. When information is received back, that information can be analyzed for hacking, spoofing, trustworthiness, and the like. Again, some or all of the analyses can be performed by the lure unmanned vehicle, or may be offloaded to a trusted entity with more resources and computing power available (e.g., the central computer circuit, an AWACS of the protection system, etc.). The false information that can be distributed for spoofing untrusted sources can include but is not limited to weather service information, kiosk information, command and control information, pilot in command information, vehicle to vehicle communication information, location information, package transfer and/or delivery information, package information, customer information, and the like. For example, when an lure unmanned vehicle 112 (and/or an unmanned delivery vehicle 110) is approaching a trusted kiosk, the lure unmanned vehicle can wirelessly transmit transfer information to the kiosk, such as approach information, package transfer requests, telemetry and altimeter information, mechanical exchange, etc. As the lure unmanned vehicle sends this information out to the trusted entity, which may be accomplished for example in an encrypted format, the lure unmanned vehicle may additionally or alternatively send out unencrypted information, such as approach, package transfer requests, etc. As the lure unmanned vehicle receives responses, the response information is analyzed by the lure unmanned vehicle and/or offloaded. Dependent upon the analysis, the lure unmanned vehicle may distribute more information to further evaluate the trustworthiness of the responding entities. For example, a request by the lure unmanned vehicle may include requesting a location for a package transfer, request whether a kiosk can accommodate a package (e.g., of predefined size, shape, etc.), and other such requests. By continuing the communication between the lure unmanned vehicle and the entity, the system can further determine the untrusted entities location (e.g., through triangulation, sensors data, communications from the untrusted entity, etc.). Further, the protection system 100 can further attempt to determine the untrusted entities intent based on the responses. Once the system has enough details to define an untrusted entity and/or its intent as untrustworthy, the system can flag the entity and distribute this information to the fleet to expose compromising entities, which can also be shared with law enforcement, etc.

Some embodiments further employ added protection procedures in attempts to protect the unmanned delivery vehicles 110 and the lure unmanned vehicles. One such procedure may include predefined communication protocols and/or sequences. For example, with two-way communication between trusted systems, each communication follows a predefined sequence of information and the sequence is evaluated prior to making critical vehicle decisions (e.g., routing, package transfers, etc.). Additionally or alternatively, the unencrypted, unsecured communication would be used for collection and analysis and would typically not be used make changes to critical vehicle decisions. Additionally, the lure unmanned vehicles and/or the unmanned delivery vehicles can operate as a repeaters of unsecured information between the central control circuit 102 and the untrusted systems. In some applications, trusted entities should be communicating with the lure unmanned vehicles and/or the unmanned delivery vehicles in a secured format from a known central authority, and typically in an encrypted format. This could be preloaded before the unmanned vehicles are launched and/or as the vehicles receive mission details, which may include a list of authorized connections with encryption and communication details. Details would accompany the entities presented in the list, such as IDs, SSIDs, IP addresses, Geolocations, visual identifiers, model numbers, version numbers, and the like.

In some embodiments, the protection system 100 make use of dedicated lure unmanned vehicles to lure and bait potential attacks, and in some implementations implement one or more counter measures. The protection system can direct anti-counter measure lure unmanned vehicles into an area where there are potential threats and/or where previous attacks and/or known threat exist. These lure unmanned vehicles can attempt to lure attacks by hackers. In response to detected attacks, the one or more lure unmanned vehicles can, for example, send jamming signals, fill a communication bandwidth with signals (e.g., create a denial of service attack on the hacker), communicate fake data to cloak and obscure the real communication data, provide points of attack into the lure unmanned vehicle by disabling and/or reducing the effectiveness of one or more protection procedures or protocols, provide artificial or virtual feedback to the attacker, provide access to one or more sub-systems and/or levels of the unmanned vehicle and/or the protection system 100, and/or other such actions. The one or more lure unmanned vehicles may be operated to provide a minesweeper method of operation, with the one or more lure unmanned vehicles 112 acting as "honey pots" vulnerable targets to a hacker, in response to detected attempted attacks and take steps to neutralize or contain the threat. The lure unmanned vehicle may be employed as sacrificial and allowed to be taken over, while other unmanned delivery vehicles 110 are able to continue on their intended missions (e.g., delivery, returns, etc.) without being attacked. Some embodiments further operate one or more AWACS unmanned vehicles that can be utilized to more effectively track lure unmanned vehicles 112, unmanned delivery vehicles 110, and/or track suspected hackers and/or hacker systems (including hacker unmanned vehicles) in an area and direct the efforts of multiple anti-counter measure unmanned vehicles and/or lure unmanned vehicles in the area. Further, in some instances, the protection system can create 2D maps, 3D maps and/or 4D maps of detected potential and/or known threats, and use that information in routing lure unmanned vehicles and/or unmanned delivery vehicles.

Further, the central control circuit 102 and/or one or more lure unmanned vehicles 112 may cate categorize threats and/or potential threats. A threat response database may associate categories of threats with one or more optimal responses for the recognized and categorized threats. The central control circuit 102 can be further configured to collect threat data detected by the lure unmanned vehicles and/or the unmanned delivery vehicles, use the data to detect attack trends, maintain a knowledge base, generate threat maps, and/or other such processing. Additionally, the central control circuit can store information about actions taken and responses to detected potential threats and actual threats, and identify successful and failed reactions. The success or failure may depend on the intended action, such as a success may be identified with an attack is extended for more than a threshold period of time, a success maybe identified when an attacker location is identified, a success maybe identified when an attacker is identified, a success may be identified when a lure unmanned vehicle enables the attack to achieve a threshold level of penetration, a failure may be identified when an attack terminates within a threshold period of time, a failure may be identified when a lure unmanned vehicle is lost or a threshold level of penetration is achieved by a hacker, and the like. Further, the central control circuit may modify subsequent responses based on the successes or failure of prior responses providing an adaptive protection system. Further, identified or detected category of an attack may allow the deployment of a lure unmanned vehicle and/or other counter measure unmanned vehicles that are selected and/or outfitted with appropriate sets of tools, components and/or technologies suited to the environment, conditions and/or category of threat. Some embodiments employ a team of lure unmanned vehicles and/or other countermeasure unmanned vehicles that can collectively collect information allowing for more accurate categorization, mapping, and/or attack identification, attacker identification, and/or selection of countermeasures. This again allows the protection system to be responsive and adaptive, allowing optimal responses for the observed threat.

The selection of the one or more protection procedures to disable or reduce effectiveness provides "honeypot" lure unmanned vehicles with at least a lower security appearance in attempts to bait attacks and make it more likely for hackers to attack the lure unmanned vehicles over the unmanned delivery vehicles and/or other systems or vehicles of the protection system 100. Again, AWACS unmanned vehicles may also be used as countermeasure vehicles as part of the protection system 100. In some embodiments, each unmanned vehicle continually monitor surroundings to seek out evidence of hacking behaviors. When hacking activity is sensed, an unmanned vehicle may switch communication protocols to go through a local trusted unmanned vehicle, relay or the like rather than directly through the network. The lure unmanned vehicles may be dedicated vehicles or could be an unmanned delivery vehicle currently not implementing a delivery. The lure unmanned vehicles can attempt to profile the attackers. Other unmanned vehicles can be deployed as countermeasure systems. The lure unmanned vehicle is operated to appear more vulnerable to attacks to present as a better target for hacker activities. The protection system can configure the lure unmanned vehicles to appear weak or vulnerable, appear to have value (e.g., carrying a package, communicating information about cargo carried, etc.), direct the lure unmanned vehicles to provide attack opportunity and awareness, and the like. The lure unmanned vehicles and/or countermeasure vehicles may transmit fake data (e.g., branding of the vehicle, owner of the unmanned vehicle (e.g., SSID="COMPANY X", etc.), cargo information (e.g., valuable, precious gems, electronics, etc.), list of fake account numbers, credentials, etc., and other such fake data). In some implementations, a lure unmanned vehicle temporarily behave as a hacked vehicle in response to an attack, respond as if the vehicle is moving toward the location where the hackers are directing (e.g., the vehicle may actually move or may spoof GPS coordinates indicating that it is moving), provide a location for the "drop" where authorities are present, conduct reverse reconnaissance of hackers while near the drop zone, use the communications with the hackers to identify aspects of the attacker (e.g., location of hackers, network ID, VPN, type of tools employed by hackers, RF Strength, other information of the hacker's hardware or software system), and the like.

Some embodiments provide systems that utilizes the lure unmanned vehicles ("honeypots") in addition to unmanned delivery vehicles to flush out potential attacks on unmanned vehicles. The system randomly selects one or more protection procedures of numerous different protection procedures that are to be disabled by a lure unmanned vehicle in order to make the lure unmanned vehicle more vulnerable to external attacks. The protection procedure can be wireless communication protection schemes, access protections, operational commands and other such protection procedures in order to avoid a potential attacker from detecting the lure unmanned vehicle as a lure or honeypot target while still making the lure unmanned vehicle to at least appear more vulnerable to attack.

Figure 5:
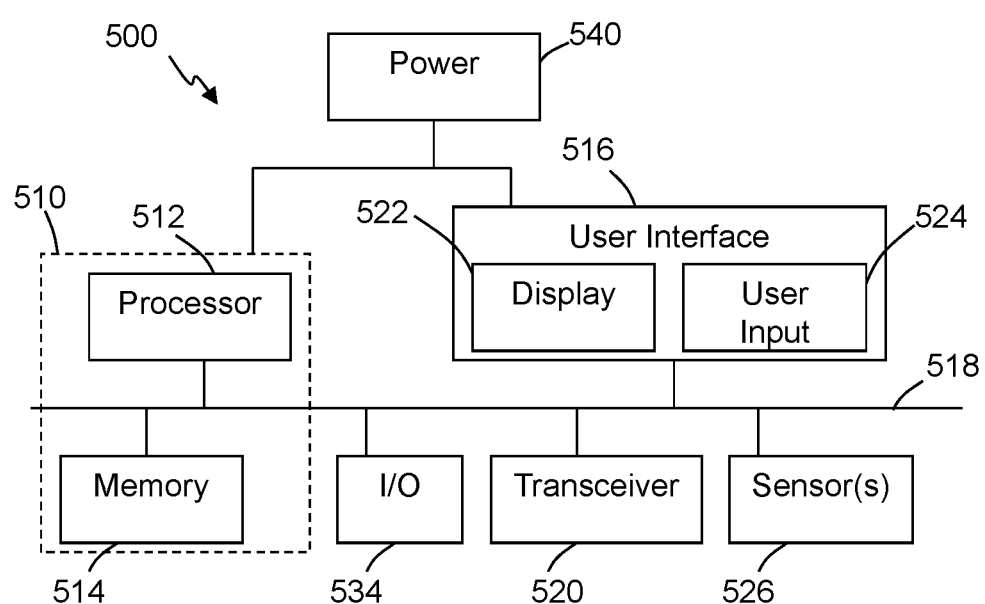
FIG. 5 illustrates an exemplary system for use in implementing methods, techniques, devices, apparatuses, systems, servers, sources and providing access to rendered retail environments, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the protection system 100, and/or other above or below mentioned systems or devices, or parts of such circuits, circuitry, functionality, systems, apparatuses, processes, or devices. For example, the system 500 may be used to implement some or all of central control circuit 102, the procedure randomization system 104, the delivery route system 108, the unmanned delivery vehicles 110, the lure unmanned vehicles 112, retail facilities, inventory system 120, point of sale systems 122, and/or other such components, circuitry, functionality and/or devices. However, the use of the system 500 or any portion thereof is certainly not required.

By way of example, the system 500 may comprise a control circuit or processor module 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network 114 (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system or components of the system, and/or sensor information that is communicated to another component, such as the central control circuit, the unmanned delivery vehicles 110, the lure unmanned vehicles 112, the route system, etc. The sensors can include substantially any relevant sensor, such as but not limited to location measurement system, signal intensity detection system, distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, image recognition systems, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor-readable and/or computer-readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 114. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

In some embodiments, a system and corresponding method performed by the system, provide unmanned retail delivery vehicle protection. Some of these embodiments comprise: a plurality of unmanned delivery vehicles (UDV) each configured to carry a package to a corresponding predefined delivery location of multiple different delivery locations, wherein each unmanned delivery vehicles comprises a vehicle control circuit configured to obtain delivery route information defining a delivery route between a launch location to a delivery location, control the unmanned delivery vehicle to travel along the delivery route from the launch location to the delivery location and release at least one package for delivery at the delivery location; a plurality of lure unmanned vehicles each comprising a lure motor, a lure propulsion system, a lure wireless transceiver, and a lure vehicle control circuit that is communicatively coupled with the lure motor, and the lure wireless transceiver; and a procedure randomization system, wherein the procedure randomization system is configured to randomly select at least a first protection procedure, of a set of a plurality of different protection procedures, that is not to be implemented by a first lure unmanned vehicle to enhance an attack vulnerability of the first lure unmanned vehicle, of the plurality of lure unmanned vehicles, from an external attack threat, wherein the set of the plurality of different protection procedures comprises at least wireless communication protection schemes, routes of travel, and operational commands; and wherein a first lure vehicle control circuit of the first lure unmanned vehicle is configured to obtain a first lure route and control the first lure unmanned vehicle to travel along the first lure route while preventing the selected first protection procedure from being applied while applying at least a sub-set of the set of the plurality of protection procedures to a full capacity while the first lure unmanned vehicle travels along the first lure route.

Some embodiments provide methods of protecting unmanned retail delivery vehicles, comprising: operating a plurality of unmanned delivery vehicles (UDV) each configured to carry a package to a corresponding predefined delivery location of multiple different delivery locations while traveling along a corresponding delivery route from a corresponding launch location to the corresponding delivery location and release at least one package for delivery at the delivery location; operating a plurality of lure unmanned vehicles; and randomly selecting, through a procedure randomization system, at least a first protection procedure, of a set of a plurality of different protection procedures, that is not to be implemented by a first lure unmanned vehicle to enhance an attack vulnerability of the first lure unmanned vehicle, of the plurality of lure unmanned vehicles, from an external attack threat, wherein the set of the plurality of different protection procedures comprises at least wireless communication protection schemes, routes of travel, and operational commands; obtaining, by a first lure vehicle control circuit of the first lure unmanned vehicle, a first lure route; and controlling the first lure unmanned vehicle to travel along the first lure route while preventing the selected first protection procedure from being applied while applying at least a sub-set of the set of the plurality of protection procedures to a full capacity while the first lure unmanned vehicle travels along the first lure route.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned retail delivery vehicle protection system, comprising:
a plurality of unmanned delivery vehicles (UDV) each configured to carry a package to a corresponding predefined delivery location of multiple different delivery locations, wherein each unmanned delivery vehicles comprises a vehicle control circuit configured to obtain delivery route information defining a delivery route between a launch location to a delivery location, control the unmanned delivery vehicle to travel along the delivery route from the launch location to the delivery location and release at least one package for delivery at the delivery location;
a plurality of lure unmanned vehicles each comprising a lure motor, a lure propulsion system, a lure wireless transceiver, and a lure vehicle control circuit that is communicatively coupled with the lure motor, and the lure wireless transceiver; and
a procedure randomization system, wherein the procedure randomization system is configured to randomly select at least a first protection procedure, of a set of a plurality of different protection procedures, that is not to be implemented by a first lure unmanned vehicle to enhance an attack vulnerability of the first lure unmanned vehicle, of the plurality of lure unmanned vehicles, from an external attack threat, wherein the set of the plurality of different protection procedures comprises at least wireless communication protection schemes, routes of travel, and operational commands; and wherein a first lure vehicle control circuit of the first lure unmanned vehicle is configured to obtain a first lure route and control the first lure unmanned vehicle to travel along the first lure route while preventing the selected first protection procedure from being applied while applying at least a sub-set of the set of the plurality of protection procedures to a full capacity while the first lure unmanned vehicle travels along the first lure route.

2. The system of claim 1, wherein the procedure randomization system is further configured to randomly select at least a second protection procedure of the set of the plurality of protection procedures that is to be implemented at a reduced capacity from the full capacity to further enhance an attack vulnerability of the first lure unmanned vehicle from the external attack threat; and wherein the first lure vehicle control circuit is configured to implement the selected second protection procedure at the reduced capacity applied while applying at least the sub-set of the set of the plurality of protection procedures to their full capacity while the first lure unmanned vehicle travels along the first lure route.

3. The system of claim 1, wherein the procedure randomization system is further configured to randomly select the first lure route from a sub-set of multiple different lure routes.

4. The system of claim 3, further comprising:

a central control circuit separate from and communicatively coupled with the plurality of unmanned delivery vehicles and the plurality of lure unmanned vehicles, wherein the central control circuit is configured to identify a location of a previously detected attack, and to define the sub-set of the multiple different lure routes, from a set of a plurality of different lure routes, that are within a threshold distance of the location of the previously detected attack.

5. The system of claim 1, further comprising:

a central control circuit separate from and communicatively coupled with each the plurality of lure unmanned vehicles, and configured to:

receive a first detection location of the first lure unmanned vehicle corresponding to a detection by the first lure vehicle control circuit of the detected external attack; and direct at least a second lure unmanned vehicle and a third lure unmanned vehicle of the set of the plurality of lure unmanned vehicles to different probing locations that are within thresholds of the first detection location, and triangulate an estimated attacker location based on subsequent location information provided by at least the second and third lure unmanned vehicles.

6. The system of claim 5, wherein the central control circuit is further configured to direct instructions to the first lure unmanned vehicle to disengage from further interaction with the external attack, and communicate a second lure route to the second lure unmanned vehicle that is within the threshold distance with the first detection location; and wherein the procedure randomization system is further configured to randomly select at least a second protection procedure, of the set of a plurality of different protection procedures, that is not to be implemented to enhance an attack vulnerability of the second lure unmanned vehicle from an external attack threat while traveling along the second lure route and while the first lure unmanned vehicle is disengaged from the external attack.

7. The system of claim 5, wherein the first lure vehicle control circuit is configured to: detect that the attack has infiltrated a first layer of operation of the first lure vehicle control circuit, present the attack with access to a predefined non-critical layer of operation, present fake information regarding the operation of the first lure vehicle control circuit through the non-critical layer of operation, and collect attack information regarding at least one or more of controls the attack is attempting to access and software tools being utilized in the attack.

8. The system of claim 1, wherein the first lure vehicle control circuit is configured to enable the attack to infiltrate a virtual vehicle control circuit of the first lure vehicle control circuit, wherein the virtual control circuit appears to the attack to implement commands from the attack to appear as though controlling the first lure unmanned vehicle without actually affecting the operation of the first lure unmanned vehicle, while providing an appearance of further penetration by the attack into the operations of the virtual vehicle control circuit.

9. The system of claim 1, further comprising:

a central control circuit separate from and communicatively coupled with the plurality of unmanned delivery vehicles and the plurality of lure unmanned vehicles, wherein the central control circuit is configured to:

receive, over time from the plurality of unmanned delivery vehicles and the plurality of lure unmanned vehicles, multiple notifications of communications detected by the plurality of unmanned delivery vehicles and the plurality of lure unmanned vehicles from multiple different untrusted sources geographically distributed over multiple different delivery routes;

evaluate each of the notifications based on a history of numerous previous other communications directed at one or more other of the plurality of unmanned delivery vehicles and the plurality of lure unmanned vehicles and acquired over time;

identify, based on the evaluation of the notifications based on the history, a first source of the multiple different sources and change a status of the first source to a first trusted source from which the plurality of unmanned delivery vehicles and the plurality of lure unmanned vehicles are subsequently to accept communications.

10. A method of protecting unmanned retail delivery vehicles, comprising:

operating a plurality of unmanned delivery vehicles (UDV) each configured to carry a package to a corresponding predefined delivery location of multiple different delivery locations while traveling along a corresponding delivery route from a corresponding launch location to the corresponding delivery location and release at least one package for delivery at the delivery location;

operating a plurality of lure unmanned vehicles; and randomly selecting, through a procedure randomization system, at least a first protection procedure, of a set of a plurality of different protection procedures, that is not to be implemented by a first lure unmanned vehicle to enhance an attack vulnerability of the first lure unmanned vehicle, of the plurality of lure unmanned vehicles, from an external attack threat, wherein the set of the plurality of different protection procedures comprises at least wireless communication protection schemes, routes of travel, and operational commands;

obtaining, by a first lure vehicle control circuit of the first lure unmanned vehicle, a first lure route; and controlling the first lure unmanned vehicle to travel along the first lure route while preventing the selected first protection procedure from being applied while applying at least a sub-set of the set of the plurality of protection procedures to a full capacity while the first lure unmanned vehicle travels along the first lure route.

11. The method of claim 10, further comprising:

randomly selecting at least a second protection procedure of the set of the plurality of protection procedures that is to be implemented at a reduced capacity from the full capacity to further enhance an attack vulnerability of the first lure unmanned vehicle from the external attack threat; and implementing, by the first lure vehicle control circuit, the selected second protection procedure at the reduced capacity applied while applying at least the sub-set of the set of the plurality of protection procedures to their full capacity while the first lure unmanned vehicle travels along the first lure route.

12. The method of claim 10, further comprising:

randomly selecting the first lure route from a sub-set of multiple different lure routes.

13. The method of claim 12, further comprising:

identifying, at a central control circuit separate from and communicatively coupled with the plurality of unmanned delivery vehicles and the plurality of lure unmanned vehicles, a location of a previously detected attack; and defining the sub-set of the multiple different lure routes, from a set of a plurality of different lure routes, that are within a threshold distance of the location of the previously detected attack.

14. The method of claim 10, further comprising:

receiving a first detection location of the first lure unmanned vehicle corresponding to a detection by the first lure vehicle control circuit of the detected external attack; and directing at least a second lure unmanned vehicle and a third lure unmanned vehicle of the set of the plurality of lure unmanned vehicles to different probing locations that are within thresholds of the first detection location, and triangulating an estimated attacker location based on subsequent location information provided by at least the second lure unmanned vehicles.

15. The method of claim 14, further comprising:

directing instructions to the first lure unmanned vehicle to disengage from further interaction with the external attack;

communicating a second lure route to the second lure unmanned vehicle that is within the threshold distance with the first detection location; and randomly selecting at least a second protection procedure, of the set of a plurality of different protection procedures, that is not to be implemented to enhance an attack vulnerability of the second lure unmanned vehicle from an external attack threat while traveling along the second lure route and while the first lure unmanned vehicle is disengaged from the external attack.

16. The method of claim 14, further comprising:

detecting, by the first lure vehicle control circuit, that the attack has infiltrated a first layer of operation of the first lure vehicle control circuit;

presenting the attack with access to a predefined non-critical layer of operation;

presenting fake information regarding the operation of the first lure vehicle control circuit through the non-critical layer of operation; and collecting attack information regarding at least one or more of controls the attack is attempting to access and software tools being utilized in the attack.

17. The method of claim 10, further comprising:

enabling, by the first lure vehicle control circuit, the attack to infiltrate a virtual vehicle control circuit of the first lure vehicle control circuit that appears to the attack to implement commands from the attack to appear as though controlling the first lure unmanned vehicle without actually affecting the operation of the first lure unmanned vehicle, and while providing an appearance of further penetration by the attack into the operations of the virtual vehicle control circuit.

18. The method of claim 10, further comprising:

receiving, over time from the plurality of unmanned delivery vehicles and the plurality of lure unmanned vehicles, multiple notifications of communications detected by the plurality of unmanned delivery vehicles and the plurality of lure unmanned vehicles from multiple different untrusted sources geographically distributed over multiple different delivery routes;

evaluating each of the notifications based on a history of numerous previous other communications directed at one or more other of the plurality of unmanned delivery vehicles and the plurality of lure unmanned vehicles and acquired over time; and identifying, based on the evaluation of the notifications based on the history, a first source of the multiple different sources and change a status of the first source to a first trusted source from which the plurality of unmanned delivery vehicles and the plurality of lure unmanned vehicles are subsequently to accept communications.

* * * * *